(12) United States Patent
Rozenfeld

(10) Patent No.: US 11,803,786 B2
(45) Date of Patent: Oct. 31, 2023

(54) ENTERPRISE INTEGRATION PLATFORM

(71) Applicant: eData Platform, Corp., Fort-Lauderdale, FL (US)

(72) Inventor: Nathan Rozenfeld, Davie, FL (US)

(*) Notice: Subject to any disclaimer, the term of this patent is extended or adjusted under 35 U.S.C. 154(b) by 736 days.

(21) Appl. No.: 14/249,684

(22) Filed: Apr. 10, 2014

(65) Prior Publication Data

US 2015/0294241 A1 Oct. 15, 2015

(51) Int. Cl.
| | | |
|---|---|---|
| *G06Q 10/06* | (2023.01) | |
| *H04L 67/02* | (2022.01) | |
| *G06Q 10/067* | (2023.01) | |
| *H04L 67/10* | (2022.01) | |

(52) U.S. Cl.
CPC ........... *G06Q 10/06* (2013.01); *G06Q 10/067* (2013.01); *H04L 67/02* (2013.01); *H04L 67/10* (2013.01); *Y02P 90/80* (2015.11)

(58) Field of Classification Search
CPC ................................ G06Q 10/06; G06F 9/541
See application file for complete search history.

(56) References Cited

U.S. PATENT DOCUMENTS

| 8,788,946 | B2* | 7/2014 | Hegde | G06F 8/38 |
| | | | | 715/236 |
| 9,070,107 | B2* | 6/2015 | Klemenz | G06Q 10/10 |
| 2003/0093402 | A1* | 5/2003 | Upton | G06F 9/542 |
| 2004/0215599 | A1* | 10/2004 | Apps | G06N 5/025 |
| 2006/0101474 | A1* | 5/2006 | Magown | G06F 9/5027 |
| | | | | 719/315 |
| 2006/0271563 | A1* | 11/2006 | Angelo | G06Q 10/06 |
| 2008/0027841 | A1* | 1/2008 | Eder | G06Q 40/00 |
| | | | | 705/35 |
| 2011/0258136 | A1* | 10/2011 | Adhiraju | G06Q 30/0281 |
| | | | | 705/342 |
| 2012/0017085 | A1* | 1/2012 | Carter | H04L 9/3213 |
| | | | | 713/168 |
| 2013/0019239 | A1* | 1/2013 | Fontignie | G06F 8/61 |
| | | | | 717/177 |
| 2015/0326594 | A1* | 11/2015 | Chari | H04L 63/1466 |
| | | | | 726/22 |
| 2017/0046135 | A1* | 2/2017 | Hazarika | G06F 9/541 |

* cited by examiner

*Primary Examiner* — Lashonda Jacobs-Burton

(74) *Attorney, Agent, or Firm* — Bonini IP Law, LLC; Frank J. Bonini, Jr.

(57) ABSTRACT

Methods and apparatus for an enterprise integration platform. An apparatus includes a processor, a network interface, and a memory, the memory comprising an operating system, a console management module to manage a console, a users management module to manage one or more users, a roles and accessibility management module, a notifications manager module, a search pad module, an application deployment manager module and an audit trail and traceability manager module.

13 Claims, 25 Drawing Sheets

200

| ID | Description |
|---|---|
| 1 | System is capable to design full featured data management web applications to be execute in a web based front end run time environment |
| 2 | System is capable to compile and deploy application on demand |
| 3 | Web Browser agnostic |
| 4 | All underlying business logic obscured as a collection of web object for additional security |
| 5 | Web service uses ad-hoc user define run time generated data sets to be send to the client |
| 6 | Web service compress and optimize data before sending on a client to reduce package size |
| 7 | Web service divides package on smaller parts when necessary to send big amount of data |
| 8 | Web service reject incoming requests if a session (authorization) is not established |
| 9 | Web service caches assemblies in a memory for multiple use. To reduce time needed for loading system objects. |
| 10 | Web service handles all errors in own validation layer to be send to the client as managed report |
| 11 | Application's source code is inaccessible to the unauthorized users |
| 13 | Web service are fully configurable |
| 14 | Ability to connect to multiple DB sources |
| 15 | Application Server can work with multiple DB connections simultaneously |
| 16 | Web service can be run under http and https protocols |
| 18 | Full user management is part of the core including password policies, roles and accessibilities |
| 19 | System supports multi site/multi department environment. Users capable to access multiples sites and departments |
|  | Entire data management is placed in a separate virtual layer creating a 100% controlled environment for data validation, processing, optimization and constrain and integrity validations |
| 20 | Data management and modifications supported by a collection of helper classes and functions which dramatically reduce amount of code developer required to access data |
| 21 | All web service calls are asynchronous |
| 23 | Designer uses own Layout controls based on standard Silverlight controls with added additional properties |
| 24 | System is capable to create a client and server libraries which can be called in any application |
| 25 | System is capable to manage and process Crystal report files |
|  | System is capable to integrate with multiple third party solutions |
|  | System is capable to operate in a cloud environment and utilize multi tenant or private deployment approach |
|  | System core features include traceability and audit trail |
|  | System contains real time notifications and alert module capable to provide real time updates to a user with no need to request an update |
|  | System upgradability is designed to allow separate module/object/run time component upgrade with no need to implement a complex upgrade procedure |
|  | System manages internal application traceability and version control |
|  | Core solutions and applications could be modified by end users with no negative ramifications |

| ID | Description |
|----|-------------|
| 1 | Only authorized users will gain access to a designer platform |
| 2 | Designer is a single integrated web based environment providing full featured development and debug environment for quick web application development. Development environment run within a web shell application with docking pane interfaces |
| 3 | Designer has the following panels: Code files tab(main area), Application Explorer, Properties, Tool Box, Console, Errors, Search Results |
| 4 | Code files tab is a tab control which contains c sharp code editors or layout designer |
| 7 | Layout designer has the following features:<br>1. Drug and drop controls from toolbox<br>2. Change control position and parent control<br>3. Delete control<br>4. Resize control<br>5. Add control event handler by double click |
| 8 | Application explorer contains tree view with all accessible applications, libraries and they files |
| 9 | Application explorer is capable to add, remove, rename, export, import and group in a folders applications and libraries |
| 11 | Application explorer categories can contain unlimited multi layer placeholders |
| 12 | Applications and libraries have property window which allows to add external assemblies and image resources |
| 13 | Before saving any modification of source code a copy of the previous version stores in the traceability module |
| 14 | Application explorer allows compile and run an application in debug window |
| 15 | Toolbox contains palette of controls accessible in the system |
| 16 | Properties panel provide ability to view and modify controls properties and search controls in layout |
| 17 | Errors panel show any errors occurred during editing source code or compiling applications. Double-click on the error message will open code file and select the line where this error found |
| 18 | Designer can utilize a web based DB Manager which gives full remote access and control to all registered databases over a secure connection |
| 19 | Designer is capable to search any text in all available application's files |
| 20 | Application preview tool execute compiled application inside debug environment and write a log of all server and DB requests, server or client debug function calls and provide this information for debugging applications |

| ID | Description |
|---|---|
| 1 | Front End is an application which provide environment for executing deployed web applications |
| 2 | Front End has the following panels: Console, applications container and notifications |
| 3 | Console contains tree view with grouped applications and dynamic menus available to user according to permissions |
| 4 | Notifications panel shows alerts and notifications addressed to current user |
| 5 | Application container can keep multiple loaded applications |
|  | Build in template driven search solution allows compiling unlimited number of search requests with ad-hoc filtering capability. Template solution allows operators to construct virtually any request to be processed via web. Returned results could be exported into various formats |
|  | Dynamically generated navigation menu allow users to see a tree view with N number of nested nodes where each node is independent and tied to the parent branch at the run time |
|  |  |

| Description |
|---|
| The application is integrated to receive plain text, binary or document files or streams from organization charts and parts them using interoperability rules into a database. |
| The application is capable to compile plain text, binary or document files using interoperability rules from database tables and send them to clients. |
| The application is capable to read plain text, binary or document files from local 90 storage. |
| The application is capable to receive files or streams through client/server TCP/IP sockets. |
| The application is capable to receive files or streams through computer serial ports. |
| The application is capable to retrieve files from PTP servers. |
| The application is capable to use SSL authentication and data encryption over HTTP, TCP/IP and FTP protocols. |
| The application is capable to save files to acsi file storage. |
| The application is capable to send files through client/server sockets both place *CP/IP and SS *CP/IP. |
| The application is capable to send files to FTP servers. |
| The application consists of a central module and a number of remote modules. |
| The application's central module has a service text which is capable to process WCF, SCAP and HTTP requests. |
| The application's remote module has a service host which is capable to process WCF, SCAP and HTTP requests. |
| The application's central module has a WCF client to call remote module web methods. |
| The application's remote module has a WCF client to call central module web methods. |
| Service host can be configured to use basic HTTP authentication or transport layer (SSL) authentication. |
| Service host has three standard web methods User/Username Password: Logout Username and ExecuteCode/LibraryName, Parameters: |
| ExecuteCode/LibraryName, Parameters: methodis used to call ----- |
| The application's remote modules (Agents) are subdivided in functional groups: |
|    ML7 structured data agent. |
|    Instrument structured data agent. |
|    Generic structured data agent. |
|    Documents agent. |
| All remote module have scheduler for monitoring new files in the local folders specified in the settings. When a new file is found, module sends it to a central module through web service call. |
| ML7 remote module has ML7 Minimal Lower-Layer Protocol (MLP) server which filters for messages. When a new message is received, module sends it to a central module using web service call. |
| Remote module may have FTP server which ----- for messages. When a new message is received, module sendsit to a central module using web service call. |
| The application's central module has a set of ----- libraries _____ which use interoperability rules to parse incoming messages into the database. |
| The application's central module has a scheduler for monitoring a database for new outgoing messages. When a new outgoing message found in the database application needs the message along with destination parameters from the database and sends both the message and the destination parameters to a remote module web service method. |
| When a message string with destination parameters is received by remote module it sends outgoing message to organization client's TCP/IP server, FTP server or saves the message in the local folder depending on destination parameters. |
| All application's modules record events and errors in event log and error rog respectively. |
| The central module is built as Microsoft Windows desktop applications using Microsoft Dot Net technology. |
| The central module is built as Microsoft Windows desktop applications using Microsoft Dot Net technology. |

| Description |
|---|
| The application is capable to virtually create mapping rules for parsing structured plan text files into database. |
| The application is capable to virtually create mapping rules for converting sets of coded elements between unlimited number of coding systems. |
| The application is capable to manage remote modules (Agents) configuration. |
| The application is capable to virtually create and edit vocabularies of coded elements. |
| The application is capable to manage parsing rules to use by interoperability application. |
| The application is built as desktop application using Microsoft Dot Net technology. |
| The application uses Microsoft SQL server. |
| All data content is built as separate user controls as loaded dynamically and is developed independently of interoperability CMS application. |
| The application main menu consists of Administration, Organizations Management, Monitor and Settings sections. |
| The Administration menu consists of Database Connections, Master Message Structures, Master Vocabulary, Agent Types and Agents submenus. |
| Database Connections submenu allows to define parameters for the system database and production databases. |
| Master Message Structures tab is built as a tree view with stability to search for and edit message elements. |
| Master Message Structures tab allows to manage master messages description. |
| Master Vocabulary tab consists of categories grid view and details grid items. |
| Master Vocabulary tab allows to manage vocabularies of coded elements. |
| Agent Types tab allows to manage sets of parameters for different types of remote modules. |
| Agents tab allows to manage parameters of each specific remote module. |
| The Organization's Management menu consists of Message Mapping, Vocabularies and Vocabulary Mapping submenus built as a tree view for each organization. |
| Message Mapping tab allows to manage message mapping to be used for communication with other organizations. |
| Message Mapping tab consists of the set of organizations and grid view for the mapping details: message name, description, dataset name, dataset. |
| Any specific mapping may be edited in the editor in a separate tab. |
| Message Mapping Editor tab consists of message tree view, dataset tree view, message ----- mapping parameters for: -----, dataset columns mapping parameters text -----, grid view of existing mapping rules, graphic view of current mapping rule and a section for search message tree and dataset tree. |
| Vocabularies tab consists of categories grid view and vocabulary grid view. |
| Vocabularies tab allowed to manage vocabularies of coded elements. |
| Vocabulary mapping tab consists of source categories and vocabulary grid view, target categories and vocabulary grid view and source to target mapping grid view. |
| Vocabulary mapping tab allows to manage source to target vocabulary mappings. |
| Monitor menu consists of Logs, Incoming Messages and Outgoing messages submitted. |
| Logs tab consists of two rich text ----- for event log and error log. |
| Incoming Messages and Outgoing Messages tabs consist of messages description grid view and text box for selected message body view. |
| Settings menu consists of a tree view of system settings categories and a grid view for managing parameters in a selected category. |
| Settings menu items are generated dynamically. Content of system menu is managed in System Table Structure submenu. |

| Description |
|---|
| The application is capable to collect, parse to base elements and store Microsoft Word documents. |
| The application is capable to collect, parse to base elements and store Microsoft Excel documents. |
| The application is capable to collect, parse to base elements and store web documents. |
| The application is capable to collect, parse to base elements and store PCP documents. |
| The application is capable to collect, parse to base elements and store text documents. |
| The application is capable to collect, parse to base elements and store ----- documents. |
| The application is capable to collect, parse to base elements and store custom document types. |
| The application is capable to store parsing results to a database. |
| The application is capable to create search criterias to search for documents. |
| The application is ----- for storing a large amounts of organization documents in the database and ability to search for a specific document using a complex search criteria. |
| The search criterias are specific for each type of document. |
| The search criterias may include words and phrases. |
| The search criterias may specify specific part of the document (header, table of contents, etc.). |
| The base parsing element is a word. |
| The application's user interface is built as web application based on Core Front End. |
| The application's remote document collection modules are built as Interoperability remote modules (See interoperability Application Server description). |
| The application's generic document partner is a part of Interoperability Application Server and is built as library using Microsoft Dot Net technology. |
| The application's document type specific document parsers are built as custom dynamic ----- libraries for each document type. |
| The application's document parsers are developed independently form Interoperability Application Server. |
| The application's web user interface consists of Administration, Document Upload and Document Search data. |
| Administration tab has a grid view of installed document parser drivers for each document type and allows to manage ----- drivers. |
| Document Upload tab allows to add new documents to the database by ----- document files to ----- |
| Document Search tab consists of a tree view of available document types and document elements for each type, section of ----- ------ for search criteria, search results grid view, found document files grid view and a button to download selected file. |
| Document search may be performed using complex And/Or/But criteria. |
| The document parser algorithm consists of following steps: |
|    Split a document into containers. |
|    Split containers into containers. |
|    Split containers into words. |
|    Insert new words into the database. |
|    Create relational links between words and sentences. |
|    Create relational links between containers and document tabs. |
| Examples of containers for text documents are: |
|    Whole document |
|    Header |
|    Footer |
|    Table of Contents |
|    Page |
|    Paragraph |

FIG. 7C

| ID | Description |
|---|---|
| 1 | The application built to receive plain text, binary or document files or streams from any registered and configured agency and process/convert/redirect/store received content using configurable and scalable interoperability solution processing templates. |
| 3 | The application is capable to read/parse/compile content received from the plain text, binary or document files and either store it or convert it or redirect it to an unlimited number of registered partners using configured method of deliver and vocabulary modifications making the content fully compliant with a client target system. No further content manipulation will be required by the receiving agency. |
| 4 | The application is capable to receive files or streams through client/server TCP/IP sockets. |
| 5 | The application is capable to receive files or streams through computer serial ports. |
| 6 | The application is capable to retrieve files from FTP servers. |
| 7 | The application is capable to use SSL authentication and data encryption over HTTP, TCP/IP and FTP protocols. |
| 8 | The application is capable to save/deconstruct/process/store file content. Stored content will be fully searchable. |
| 9 | The application is capable to send files through client/server sockets both plain TCP/IP and SSL TCP/IP. |
| 10 | The application is capable to send files to FTP servers. |
| 11 | Unlimited number of remote agents and processing adapters could be added to the system at any time. |
| 12 | The application's core module has a service host which is capable to process WCF, SOAP and HTTP requests. |
| 13 | The application's remote module has a service host which is capable to process WCF, SOAP and HTTP requests. |
| 14 | The application's core module has a WCF client to call remote module web methods. |
| 15 | The application's remote module has a WCF client to call central module web methods. |
| 16 | Service host can be configured to use basic HTTP authentication or transport layer (SSL) authentication. |
| 17 | Service host has a set of core secure Web Services allowing the interoperability solution to be used as a data and content serving agent. All the registered users might access the system to retrieve or post content in authenticated and secure environment. |
| 19 | The application's remote modules (Agents) are subdivided in functional groups:<br>    Structured content data agent.<br>    Instrument structured data agent.<br>    Generic structured data agent.<br>    Documents management agent. |
| 20 | All remote modules have scheduler monitor track all the incoming and outgoing tasks and process them in a timely fashion, making the system fully automated once deployed. When new content arrives module sends it to the core through secure web service. |
| 21 | Any arriving structured feed triggers a core remote agent to capture content. Captured content moved into the processing where its being transformed into desired target and all the required business logic, validations and vocabulary conversion performed. Result is a transformed content ready to be delivered to its destination(s). |
| 22 | Remote module may have FTP server which listens for messages. When a new message is received, module sends it to a central module using web service call. |
| 23 | The application's core module has a collection of processing parser libraries -- adapters that utilize interoperability processing template to transform the content. |
| 24 | The application's core module equipped with a monitoring scheduler to ensure all the outgoing messages are processed correctly. When a new outgoing message found the application reads the message along with destination parameters and sends both the message and the destination parameters to be processed in the remote module. |
| 25 | When a message along with destination parameters received by remote module it sends outgoing message to organization client's TCP/IP server, FTP server or saves the message in the local folder depending on destination parameters. |
| 26 | All application's modules record events and errors in event log and error log respectively. |
| 27 | The core module built as Server Applications using Microsoft .NET technology. |
| 28 | Remote modules can be built as desktop, service or mobile application on any Operating system. |

FIG. 8

| ID | Description |
|---|---|
| 1 | The application is capable of creating visual mapping rules for parsing structured content to and from storage location. |
| 2 | The application is capable of creating visual mapping rules for convert sets of coded elements between unlimited number of coding systems. |
| 3 | The application is capable to manage remote modules (Agents) configuration. |
| 4 | The application is capable to visually create and edit vocabularies of coded elements. |
| 5 | The application is capable to manage parsing rules to use by Interoperability application. |
| 6 | The core module built as Server Applications using Microsoft .NET technology. |
| 7 | The application uses Microsoft SQL Server. |
| 9 | The entire configuration solution built as a collection of user deployed plug and play controls that are loaded dynamically. Each loaded module can be developed independently of the main Interoperability CMS application. |
| 10 | The application main menu consists of Administration, Organizations Management, Monitor and Settings sections. |
| 11 | The Administration menu consists of Database Connections, Master Message Structures, Master Vocabulary, Agent Types and Agents submenus. |
| 12 | Database Connections submenu allows to define parameters for the system database and production databases. |
| 13 | Master Message Structures tab is built as a tree view with ability to search for and edit message elements. |
| 14 | Master Message Structures tab allows to manage master messages description. |
| 15 | Master Vocabulary tab consists of categories grid view and details grid view. |
| 16 | Master Vocabulary tab allows to manage vocabularies of coded elements. |
| 17 | Agent Types tab allows to manage sets of parameters for different types of remote modules. |
| 18 | Agents tab allows to manage parameters of each specific remote module. |
| 19 | The Organizations Management menu consists of Message Mapping, Vocabularies and Vocabulary Mapping submenus built as a tree view for each organization. |
| 20 | Message Mapping tab allows to manage message mapping to be used for communication with other organizations. |
| 21 | Message Mapping tab consists of the list of organizations and grid view for the mapping details (message name, description, dataset name, status). |
| 22 | Any specific mapping may be edited in the editor in a separate tab. |
| 23 | Message Mapping Editor tab consists of message tree view, dataset tree view, message field mapping parameters text box, dataset columns mapping parameters text box, grid view of existing mapping rules, graphic view of current mapping rule and a section for search message tree and dataset tree. |
| 25 | Vocabularies tab allows to manage vocabularies of coded elements. |
| 26 | Vocabulary mapping tab consists of source categories and vocabulary grid view, target categories and vocabulary grid view and source to target mapping grid view. |
| 27 | Vocabulary mapping tab allows to manage source to target vocabulary mappings. |
| 28 | Monitor menu consists of Logs, Incoming Messages and Outgoing messages submenus. |
| 29 | Logs tab consists of two rich text boxes for event log and error log. |
| 30 | Incoming Messages and Outgoing Messages tabs consists of messages description grid view and text box for selected message body view. |
| 31 | Settings menu consists of a tree view of system settings categories and a grid view for managing parameters in a selected category. |
| 32 | Settings menu items are generated dynamically. |

| ID | Description |
|---|---|
| 1 | The application developed for collection, parsing and storing output data from different types of industrial equipment. |
| 2 | The application is capable to collect data through computer serial port. |
| 3 | The application is capable to collect data by monitoring and collecting plain text and binary files. |
| 4 | The application is capable to manage list of instruments. |
| 5 | The application is capable to manage web service connection. |
| 6 | The application is capable to manage serial port communication parameters. |
| 7 | The application is capable to manage data file locations. |
| 9 | The application's data parser is a run time loaded module. |
| 10 | The application's data parser stores parsed results in a destination data storage. |
| 11 | The application uses Microsoft SQL Server. |
| 12 | User interface allows to manage collection of registered instruments, individual instrument manager, Station Manager, Tracer Log and Instrument Data tabs. |
| 13 | Station Manager provides support for tracer to app. Server via secure web service. Creating an open communication model and allow placement of the instrument tracer virtually anywhere within the organization. Instrument tracer serves as a collection agent and capable to establish communication with any instrument utilizing RS232 as an exchange protocol, or a proprietary binary feed. |
| 15 | Instrument Manager supports view of parsed and stored data. |
| 16 | Tracer Log tab allows to view system events and error log. |
| 17 | Application data parser uses parsing rules created in Equipment Manager Front End application. |
| 18 | Application data parser allows following input types: binary stream from serial port, text stream from serial port, plain text form files. |
| 19 | Application data parser searches for the patterns described in parsing rules, splits incoming stream or file into a structured data and saves the data into a database in form of parameter name / parameter value pairs. |
| 20 | Application has separate sets of rules for parsing serial port stream and plain text form files. |
| 21 | Serial port parsing rules set consists of following definitions. |
| 22 |     Rule Data Type with values: |
| 23 |         Binary |
| 24 |         String |
| 25 |     Minimal Length (integer) |
| 26 |     Maximal Length (integer) |
| 27 |     Field Groups Layout with values: |
| 28 |         Vertical |
| 29 |         Horizontal |
| 30 |     Header Type with values: |
| 31 |         Fixed |
| 32 |         Delimited |
| 33 |     Header First Byte (byte) |
| 34 |     Header Length (integer) |
| 35 |     Header First Delimiter (byte) |
| 36 |     Header Last Delimiter (byte) |
| 37 |     Body Type with values: |
| 38 |         Fixed |
| 39 |         Delimited |
| 40 |     Body First Byte (byte) |
| 41 |     Body Length (integer) |
| 42 |     Body First Delimiter (byte) |
| 43 |     Body Last Delimiter (byte) |
| 44 |     Body Inner Delimiter (byte) |
| 45 |     Virtual Table Name (as an identifier to collection of display columns). |
| 46 |     Column Name, Column Header, Value Type (used for visual presentation of received data) |
| 47 |     Validation Parameters (High, Low, Critical High, Critical Low) |
| 48 | Serial port parsing rule is intended to split the message into data fields either by absolute position of each field in the message stream or by the specified delimiter. |
| 49 | Message Header definition is intended to distinguish a specific message and apply a specific rule to a message body. |
| 50 | Plain text form parsing rules set consists of following definitions. |
| 51 |     General Specification: |
| 52 |         Characters Encoding |
| 53 |         Decimal Format |
| 54 |         Date Format |
| 55 |     Sections Definitions: |
| 56 |         Section Type: |

| ID | Description |
|---|---|
| 57 | Summary (Information related to the whole form) |
| 58 | Table (Separate set of data) |
| 59 | Begin Type |
| 60 |     Delimited |
| 61 |     Fixed |
| 62 |     Form Top |
| 63 | End Type |
| 64 |     Delimited |
| 65 |     Fixed |
| 66 |     Form End |
| 67 | First Line Number (for fixed types) |
| 68 | Total Lines (for fixed types) |
| 69 | First Delimiter (for delimited types) |
| 70 | Last Delimiter (for delimited types) |
| 71 | Table definitions (for each section) |
| 72 |     Header Type |
| 73 |         Delimited |
| 74 |         Fixed |
| 75 |         None |
| 76 |     Header Delimiter (for delimited types) |
| 77 |     Header Inner Delimiter (for delimited types) |
| 78 |     Columns widths (for fixed types) |
| 79 |     Row Composition |
| 80 |         Horizontal |
| 81 |         Vertical |
| 82 |         Table |
| 83 |     Field Type |
| 84 |         Delimited |
| 85 |         Fixed |
| 86 |     Field Delimiter (for delimited types) |
| 87 |     Field Inner Delimiter (for delimited types) |
| 88 |     Column definitions (for each table) |
| 89 |         Name |
| 90 |         Title |
| 91 |         Width |
| 92 |         Data Type |
| 93 |             String |
| 94 |             Integer |
| 95 |             Float |
| 96 |             Boot |
| 97 |             Date Time |
| 98 | Serial port parsing rule is intended to split the form into data fields. |
| 99 | The first step is to split the form into logical sections. Section may be either delimited or has a fixed position in the form specified by top line number and total lines number. |
| 100 | The second step is to split a section into tables based on the format. Section may have a line of delimited fields and several rows and columns of data with column headers. Each specifically formatted block of data is referred to as table. |
| 101 | The third step is to define columns for each table. Column header may be retrieved from a table and/or assigned manually as well as column data type. |

| ID | Description |
|---|---|
| 1 | The application is managing organization's measuring instruments inventory, configuration of parsing rules for each model of instrument and monitoring measurement results for each specific instrument. |
| 2 | The application is capable to manage inventory of instruments. |
| 3 | The application is capable to manage inventory of instruments' parts. |
| 4 | The application is capable to manage inventory of instruments' supplies. |
| 5 | The application is capable to manage instruments' communication parameters. |
| 6 | The application is capable to manage parsing rules for storing instrument output data. |
| 7 | The application is capable to view instrument output data in form of tables and diagrams. |
| 8 | The application is built as web application based on Core Front End. |
| 9 | The application's user interface consists of Settings, Summary and Inventory Manager menus. |
| 10 | Settings menu consists of Parsing Rules, Master Forms and Instrument Models submenus. Each submenu item opens corresponding tab in user interface. |
| 11 | Parsing Rules tab consists of a grid view of instrument models and tabbed control with tabs for General Info and Rule Details. |
| 12 | General info tab consists of combo boxes and text boxes for configuring parsing rules for selected instrument model. Rule may specify stream data type (binary or string), composition type (fixed or delimited), fields and rows delimiters, fields and rows widths. |
| 13 | Rule details tab consists of a grid view for message fields and combo boxed and text boxes for managing parameters of selected field. Parameters include data type, presentation parameters and validation criteria's. |
| 14 | Master Forms supports creation of parsing rules for plain text forms. |
| 15 | Master Forms tab consists of drag-and-drop area for adding a form file which requires parsing rules, text boxes for original element view and parsing preview and tab control with Master Form, Sections, tables and Columns tabs. |
| 16 | Master Forms sub-tub consists of a grid view of form definitions, buttons for managing forms and combo boxes for managing general properties of the form such as encoding, date and number formats. |
| 17 | Sections sub-tub consists of a grid view of form logical sections, buttons for managing sections and combo boxes for managing section parameters like composition, delimiter and top and bottom positions. |
| 18 | Tables sub-tub consists of a grid view of section tables, buttons for managing tables and combo boxes and text boxes for managing table parameters like composition, header and field delimiters and column widths. |
| 19 | Columns sub-tub consists of a grid view of table columns, buttons for managing tables and combo boxes and text boxes for managing column properties like data type and column title. |
| 20 | Instrument Models tab consists of a grid view of instrument models and tabbed control for managing communication mode and parameters like serial port parameters, incoming and outgoing messages parameters. |
| 21 | Summary menu consists of instrument Result Tables submenu. |
| 22 | Instrument Result Tables tab consists of a grid view of instruments and grid views of instrument measurement results. |
| 23 | Inventory Management menu consists of Manufacturers Manager and Provides Manager submenus. |
| 24 | Manufacturers Manager tab consists of grid view of manufacturers details and text boxes and combo boxes for managing selected manufacturer properties. |
| 25 | Providers Manager tab consists of grid view of providers details and text boxes and combo boxes for managing selected provider properties. |

| ID | Description |
|---|---|
| 1 | The application is capable to collect, parse to base elements and store Microsoft Word documents. |
| 2 | The application is capable to collect, parse to base elements and store Microsoft Excel documents. |
| 3 | The application is capable to collect, parse to base elements and store web documents. |
| 4 | The application is capable to collect, parse to base elements and store PDF documents. |
| 5 | The application is capable to collect, parse to base elements and store text documents. |
| 6 | The application is capable to collect, parse to base elements and store scanned documents. |
| 7 | The application is capable to collect, parse to base elements and store custom document types. |
| 8 | The application is capable to store parsing results to a database. |
| 9 | The application is capable to create search criteria's to search for documents. |
| 10 | The application built for storing large amounts of organization documents in the database and ability to search for a specific document using complex search criteria. |
| 11 | The search criteria's are specific for each type of document. |
| 12 | The search criteria's may include words and phrases. |
| 13 | The search criteria's may specify specific part of the document (header, table of content, etc.). |
| 14 | The base parsing element is a word. |
| 15 | The application's user interface is built as web application base on Core Front End. |
| 16 | The application's remote document collection modules are built as interoperability remote modules (See interoperability Application Server description). |
| 17 | The application's generic document parser is a part of Interoperability Application Server and built using Microsoft .Net technology. |
| 18 | The application's document type specific document parsers built as custom dynamic link libraries for each document type. |
| 19 | The application documents parsers developed independently form Interoperability Application Server. |
| 20 | The application's web user interface consists of Administration, Document Upload and Document Search tabs. |
| 21 | Administration tab has a grid view of installed document parser drivers for each document type and allows managing installed drivers. |
| 22 | Document Upload tab allows to add new documents to the database by dragging document files to it. |
| 23 | Document Search tab consists of a tree view of available document types and document elements for each type, section of text boxes for search criteria, search results grid view, found document files grid view and a button to download selected file. |
| 24 | Document searches could be configured by using complex And/Or/But criteria. |
|  | Split a documents into containers. |
|  | Split containers into sentences. |
|  | Split sentences into words. |
|  | Insert new words into the database. |
|  | Create relational links between words and sentences. |
|  | Create relational links between containers and document files. |
| 26 | Examples of containers for text documents are: |
|  | Whole document |
|  | Header |
|  | Footer |
|  | Table of Contents |
|  | Page |
|  | Paragraph |

FIG. 14

ENTERPRISE INTEGRATION PLATFORM

CROSS REFERENCE TO RELATED APPLICATIONS

This application claims priority under 35 USC § 119(e) to U.S. Provisional Application Ser. No. 61/810,315, filed on Apr. 10, 2013, and entitled ENTERPRISE INTEGRATION PLATFORM, and to U.S. Provisional Application Ser. No. 61/864,008, filed on Aug. 9, 2013, and entitled ENTERPRISE INTEGRATION PLATFORM, the entire contents of which are hereby incorporated by reference.

BACKGROUND OF THE INVENTION

The present invention relates to computer systems and methods, and more particularly to an enterprise integration platform.

In the typical life cycle of a software product, the proportional maintenance costs range from 49% for a pharmaceutical company to 75% for a manufacturing company. The increasing pressure on organizational IT budgets has created a growing demand for robust solutions that address the business needs of today and tomorrow without breaking the bank. To answer the call, solutions must be cost-effective to deploy and maintain. They must integrate and be interoperable with internal and external partner systems and work synergistically with legacy systems. Scalability is of great import and subsequent upgrades and updates must be included as part of routine support. Lastly, the successful solution will utilize a true Web architecture and be based on best-of breed technologies so that the cutting edge is not sacrificed for affordability. Creating a robust and scalable IT infrastructure becomes one of the most important tasks to focus on. Many government and private agencies dedicate substantial funds to making sure such infrastructure is in place and ready to support ever-growing need of the community.

The "one size fits all" approach of typical software vendors often forces organizations to adapt their business processes in order to fit a software package's design. We believed that a product's development should be driven by our customers' needs. The result is a system that easily adjusts to a business's needs without costly changes to the software or the organization.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to computer systems and methods implementing an enterprise integration platform.

In one aspect, the invention features an apparatus including a processor, a network interface, and a memory, the memory comprising an operating system, a console management module to manage a console, a users management module to manage one or more users, a roles and accessibility management module, a notifications manager module, a search pad module, an application deployment manager module and an audit trail and traceability manager module.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 2 is a table of exemplary eData platform features.
FIG. 3 is a table of exemplary designer features.
FIG. 4 is a table of exemplary front-end features.
FIGS. 7A, 7B and 7C are tables of exemplary remote agent features.
FIG. 8 is a table of exemplary adapter features.
FIG. 9 is a table of exemplary content management solution features.
FIG. 11 and FIG. 12 are tables of exemplary equipment tracer features.
FIG. 13 is a table of exemplary configuration manager features.
FIG. 14 is a table of exemplary librarian features.

DETAILED DESCRIPTION

Figure 1:
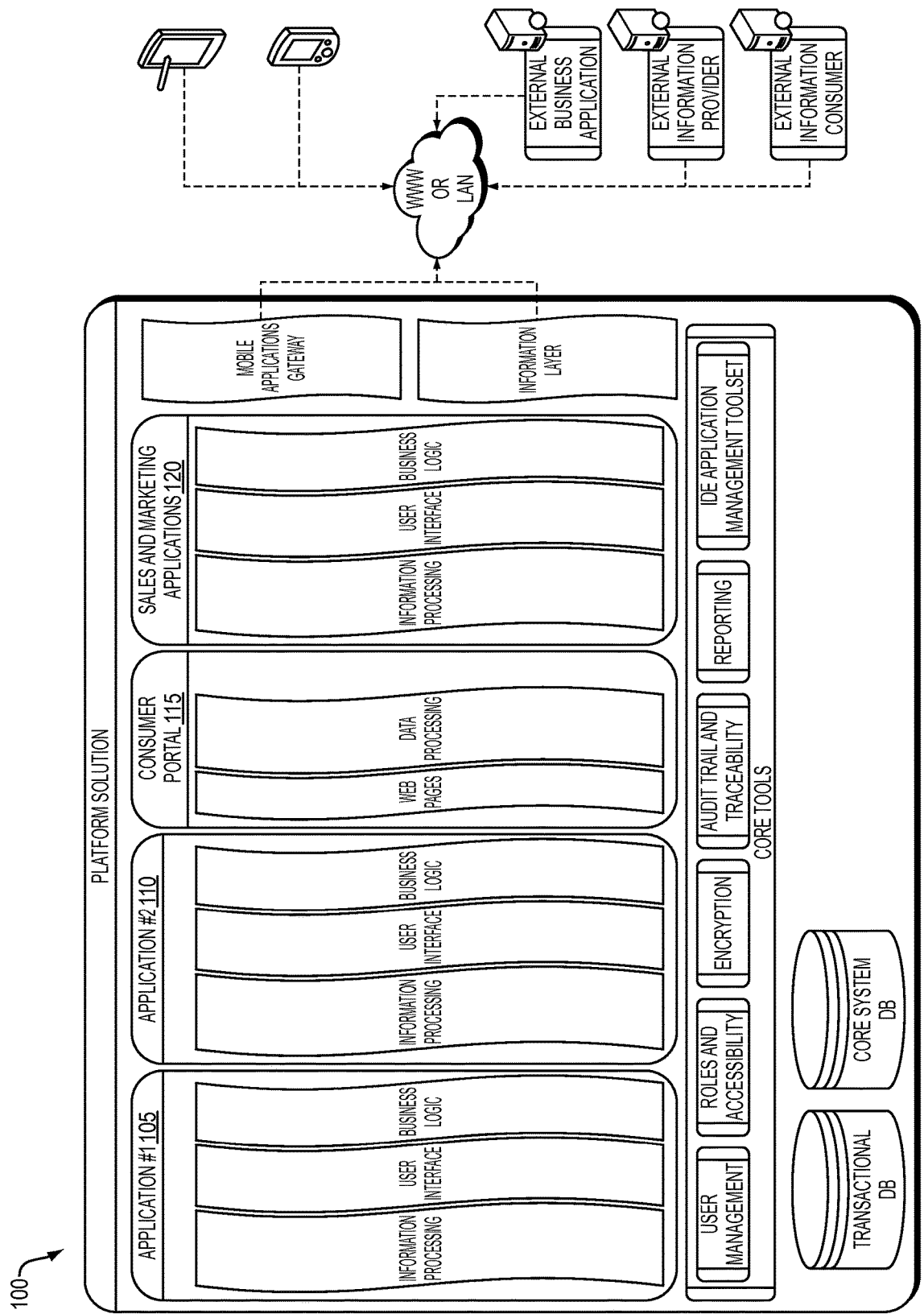
FIG. 1 is a block diagram of an exemplary eData platform.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In the description below, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The enterprise integration platform of the present invention, also referred to herein as the "eData Platform," enables an ability to develop, deploy and support a suit of diverse desktop and mobile applications, enables scalable information management solutions, information security, information exchange and adaptability to evolving information content.

The eData Platform of the present invention creates a community of service providers and consumers through social networking Online training and support.

Unlike most solutions available today, the eData Platform of the present invention leverages multiple best of breed technologies and creates an abstract platform to develop, deploy and upgrade an entire suite of applications without the need for costly migrations. By utilizing a cloud-based model, the eData Platform eliminates or minimizes the need for a local support staff, incorporating a substantial amount of software maintenance and routine development into routine software support.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As shown in FIG. 1, an exemplary eData platform 100 is a software design, deployment and maintenance platform housing dozens of diverse solutions under one scalable platform. The common platform 100 enables the IT staff to share substantial amount of mission critical functions, reduce the number of IT members to support each application. In one example implementation, the platform 100 is deployed as a "black box" solution housed internally or a Cloud based (Software as a Service (SaaS)) type of service.

The eData Platform 100 is capable of hosting a diverse library of applications with a focus on a simple method for changing existing applications or adding new applications. As a scalable and cost effective platform, it is capable of managing back-end databases and applications as well as an integrated front-end to deploy applications with ease. There is no limit to the number of applications that can be deployed. Each deployed application comes with the flexibility to be easily modified as the needs of the business change. Moreover, unlike many software packages on the market today, those applications running on the platform 100, sometime referred to herein as "eData Platform applications," can grow with the organization without incurring sizable maintenance costs.

With the eData Platform 100, system administrators and end-users can publish design, develop, deploy and maintain applications at an accelerated rate making them accessible to a business's daily operations as quickly as possible. The abbreviated turnaround time is made possible by employing key built-in features including Console Management, Users Managements, Roles and Accessibility Management, Notifications Manager, Search Pad, Application Deployment manager and Audit Trail and Traceability Managers. Further, the integrated environment simplifies deployment of data management applications without the need for a costly support staff.

Exemplary eData Platform features are shown in a table 200 in FIG. 2, exemplary designer features are shown in a table 300 in FIG. 3, and exemplary front-end features are shown in a table 400 in FIG. 4.

Figure 5:
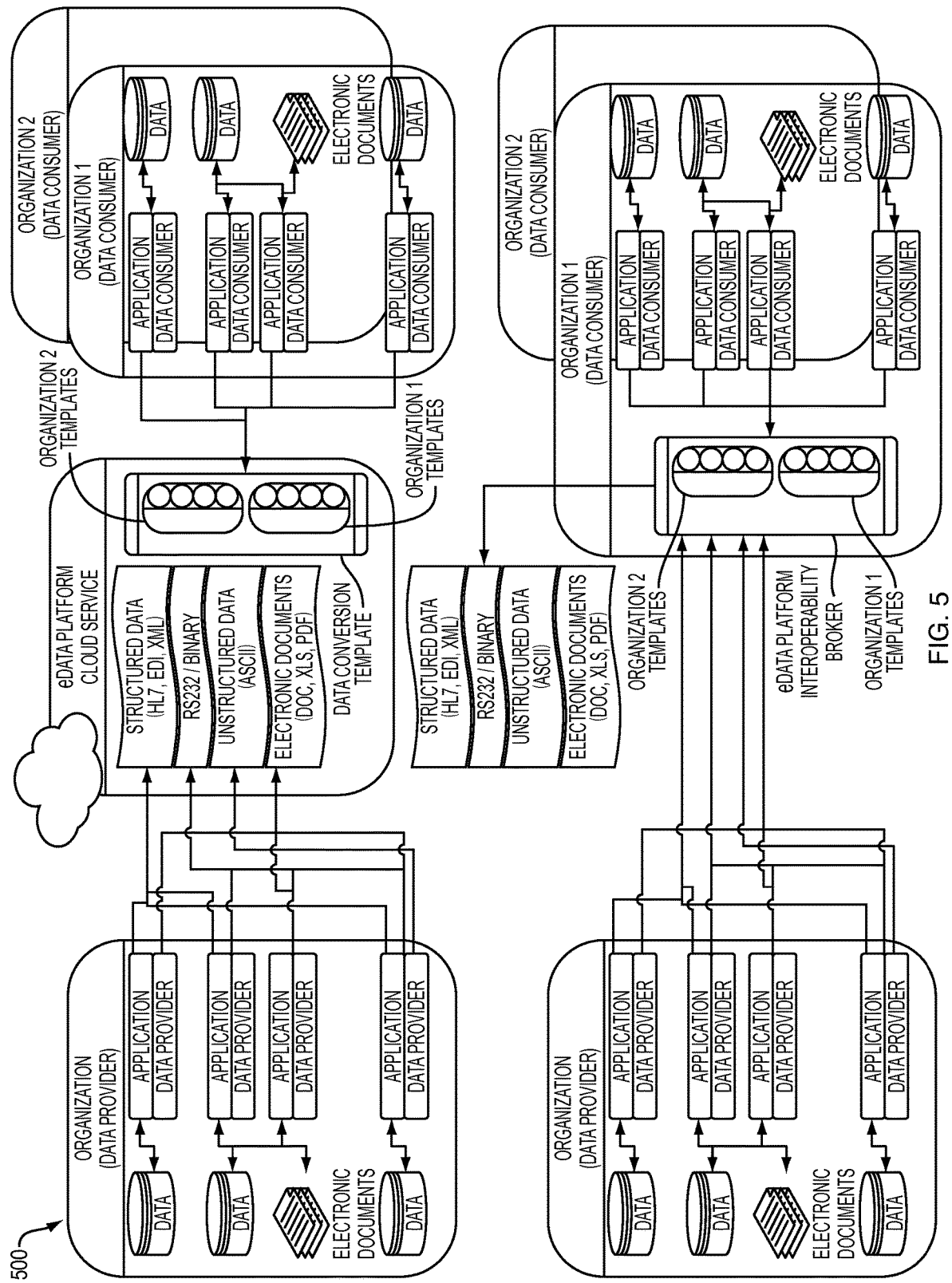
FIG. 5 is a block diagram of an exemplary eData platform.

As shown in FIG. 5, the eData Platform 500 is a development and deployment environment, supporting secure processing, conversion and exchange of all known structured and unstructured electronic feeds. The platform 500 is capable to capture, reconfigure, store/redirect and deliver information to unlimited number of registered partners. Each partner is able to exchange any electronic content using multiple deliverable vehicles (FTP, TCP/IP, Folder monitoring and so forth) The platform 500 is capable to adapt unlimited number of monitoring agents and adapters and underlying databases. Each can be configured to work within the platform. The platform 500 provides the ability for diverse systems and organizations to securely and reliably exchange information. The platform 500, a user-configurable tool, conforms to an organization's requirements making it possible for reporting and/or data sharing with unlimited external partners.

Many legacy systems lack established communication and standard vocabulary mappings. Contemporary systems with these capabilities face the challenge of exchanging data with other agencies since many of them do not operate on a scalable platform that allows user-profile management and efficient data exchange. In order to link systems, a custom solution is required which entails substantial capital investment.

Although many structured and standard exchange formats exists today it is virtually impossible to adapt a new data feed and have the ability to transform received data into a target system manageable content, the number of variables and versions makes it difficult for agencies to efficiently publish and retrieve data. The widely varying local vocabularies can lead to performance degradation stemming from prolonged processing (encoding and translation) times.

Figure 6:
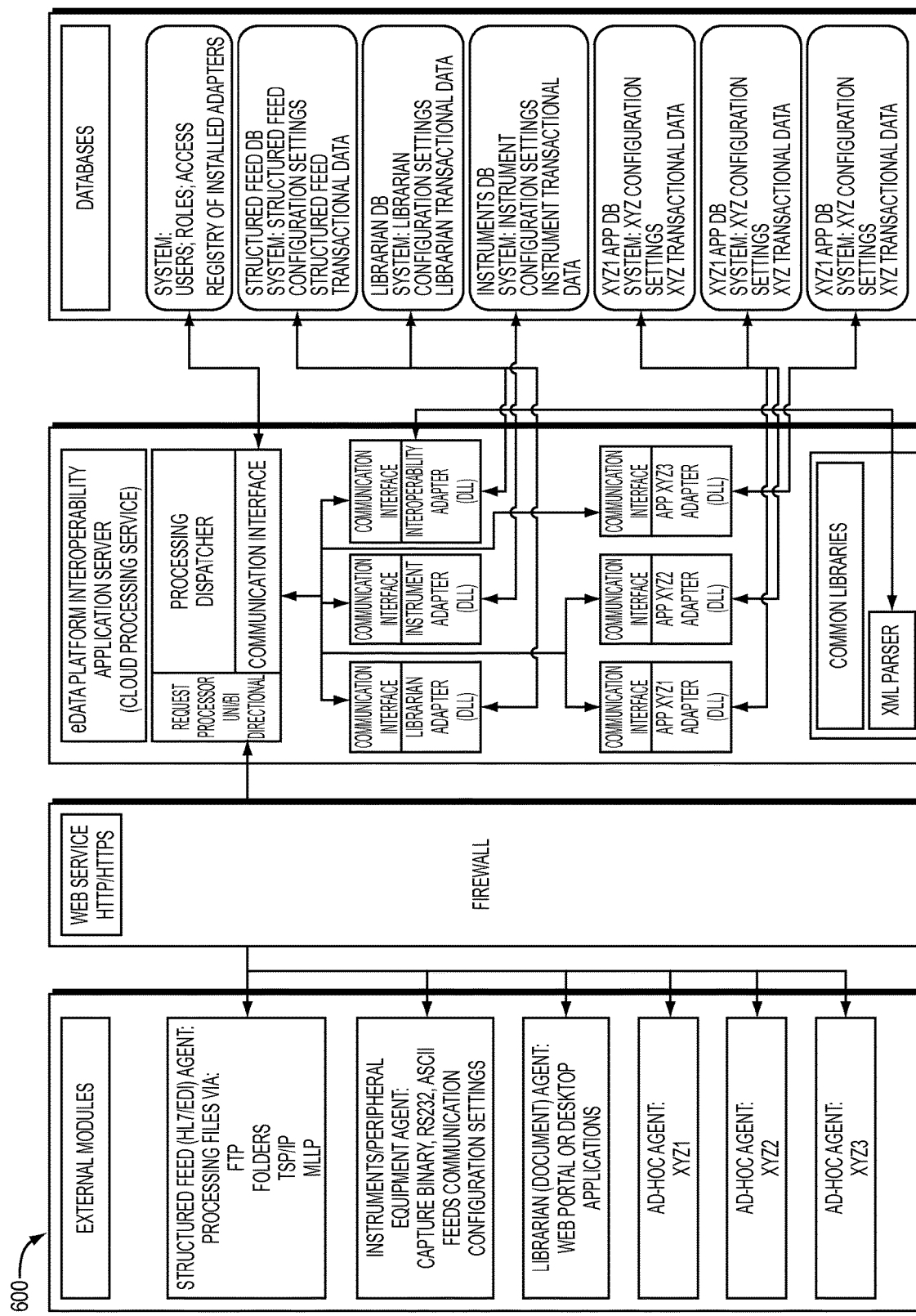
FIG. 6 is block diagram of an exemplary interoperability broker.

As shown in FIG. 6, an interoperability broker 600 includes Remote Agents, Application Processing Server and Processing Adapter, Content Management Solution (CMS) and Data Repository.

More specifically, interoperability contains four independent sub components.

Agents

An agent is a stand alone application or module of another application located on a remote client computer. The main goal of an agent is collecting information on a client computer and maintaining communication with interoperability dispatcher. Agent can receive information in a different ways.

1. Agent can work in background and periodically scan local or remote folder on new files.

2. Agent can work in background and receive data from external ports (USB, RS232, . . . ).

3. Agent can be an Object Linking and Embedding (OLE) object.

4. Agent can be a part of existing third party application.

An agent uses a web service call to communicate with an interoperability dispatcher. Before sending data, an agent must login to server. If a dispatcher accepts a username and a password, it returns to an agent, a unique token and all following communications use this token to verify a request.

If necessary, an agent can work bidirectionally and receive requests from dispatcher.

Each agent has its own unique identifier number, which shows to a dispatcher how to proceed with a received message.

When an agent starts the first time, it reads an "ini" file to get a dispatcher host address and its own identification (ID). After that, an agent can request initialization information from a dispatcher by a calling web service method.

All agent properties are stored in the interoperability system database and can be modified in the Management Console.

Interoperability Dispatcher

Dispatcher is a stand alone windows application with web service implementation. Dispatcher can be adjusted to work on any TCP/IP port. Dispatcher web server can receive standard SOAP and JSON requests from any types of operation systems and applications. Dispatcher web service has four methods:

Login(string username, string password). The Login method authorize an agent and create a session with unique token.

Logout(string username). The Logout method close an existing session.

Execute(string method, string token, string[ ] parameters). The Execute method redirects data from an agent to an adapter indicated in the method parameter. To call Execute method an agent must login and use received token in the request.

GetInit(string agentID, string token). The GetInit method returns initialization data for particular agent from system database.

The main goal of the Dispatcher is joining agents and adapters. Depend on settings, Dispatcher can use previously loaded adapter or create a new instance of an adapter to execute requested method. Dispatcher can send request on remote web services.

All Dispatcher properties are stored in the interoperability system database and can be modified in the Management Console.

Adapters

Adapters are .NET pre-compiled DLL modules, which process agents request and return result to an agent. Adapters contain a group of public methods available to dispatcher. One adapter can be used by multiple agents. Adapter can work in the background and send requests to agents via dispatcher. Adapters are capable to use external libraries located on the same server. Adapters must have direct access to databases to execute agent's requests. All Adapter properties are stored in the interoperability system database and can be modified in the Management Console.

Message Parser

Message parser is an external .NET library that converts one type of messages to another. The incoming message must be an ASCII text. To parse none text message such a bit array it must be converted to string before parsing. To convert one type of message to another the parser uses templates. Templates are XML files with predefined rules that fully describe a conversation process. The parser uses an intermediate XML (iXML) file to simplify and reorganize incoming data. All operations go only through the iXML file. The structure of iXML is created to be simple to enable third party developers to create their own parser which will work with iXML.

Templates are able use JavaScript or T-SQL scripts to implement complicated business logic. Templates can be created in the Management Console.

There are four types on templates/converting operations, i.e., incoming message to iXML, iXML to database, database to iXML, iXML to outgoing message.

Each template type has own format, functionality and scripts. iMXL to database template create a T-SQL statement that has all instruction to add data into database with correct supporting key constrains.

Exemplary properties of the remote agent are shown in the tables in FIGS. 7A, 7B and 7B.

An Application Processing Server and Processing Adapter 700 includes the exemplary features shown in a table 800 of FIG. 8.

A Content Management Solution 900 includes the exemplary features shown in a table 1000 of FIG. 9.

Figure 10:
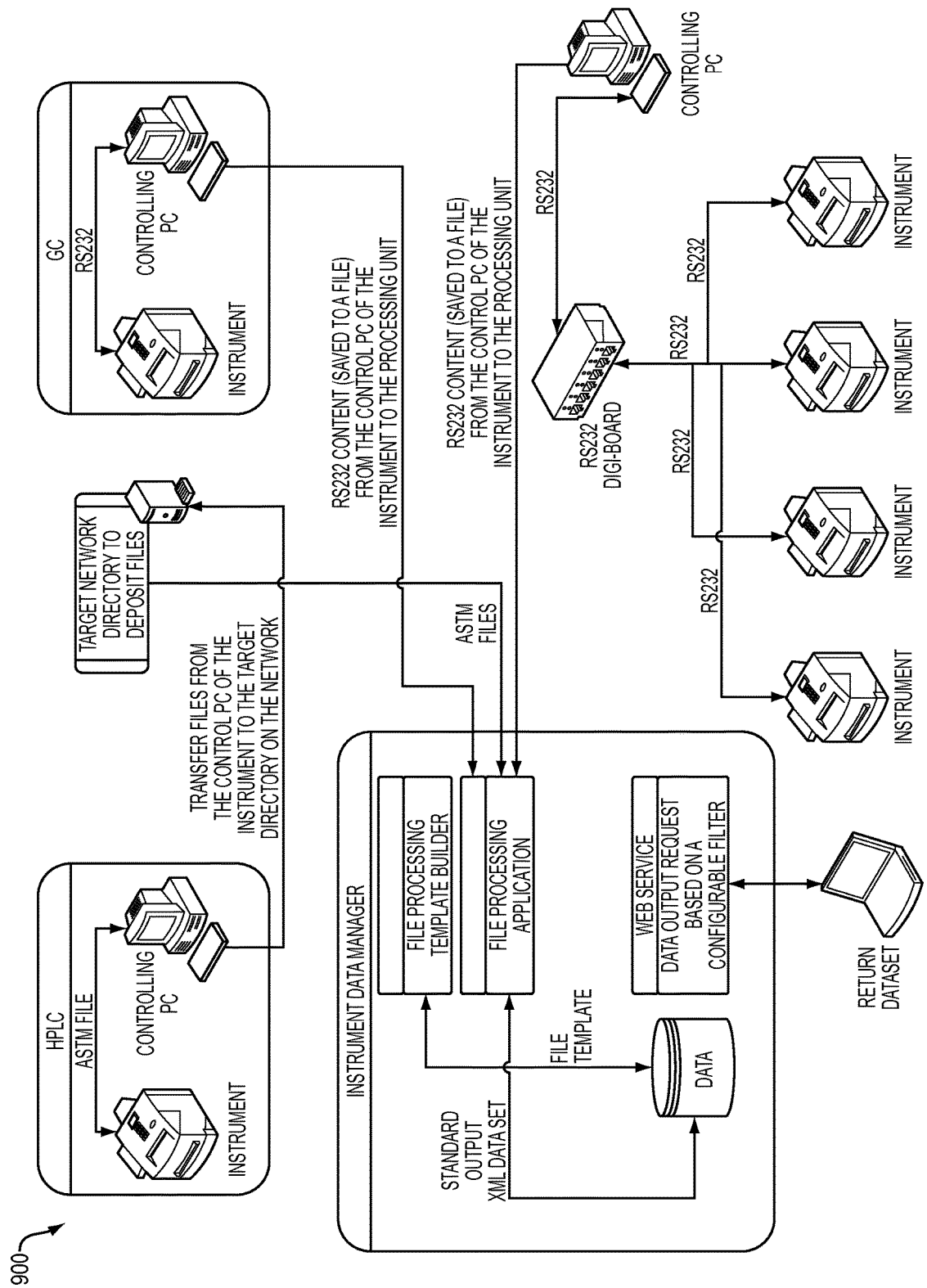
FIG. 10 is a block diagram of an exemplary eData platform.

As shown in FIG. 10, the eData Platform 1100 offers organizations an alternative to the one-off equipment interface approach. The Interoperability CMS allows an organization to easily configure as many equipment interfaces as is necessary. Each interface can be configured to securely send and/or receive data between other pieces of equipment or other systems—external or internal to the organization—using the protocol specified by the equipment manufacturer.

Exemplary features of an equipment tracer 1200 are shown in the tables 1400 and 1500 in FIG. 11 and FIG. 12, respectively.

Exemplary features of an equipment configuration manager 1600 are shown in a table 1700 in FIG. 13.

Organizations receive and store large volumes of documents in various electronic and hard copy formats. At present, while it is fairly simple to search for a term within a single document, there is no efficient way to search for keywords or phrases across multiple documents or sections of documents. An eData Platform Librarian 1800 is a document management solution that gives organizations the power to scan or upload documents to a data repository and search for keywords or phrases within a section of a document, the entire document or a collection of sections or documents.

By using the Librarian's unique driver configuration tool, an organization can import any document in any format based on their precise specifications. This configurability makes the Librarian 1800 a powerful tool for data mining, cross-cutting reports and more.

Exemplary features of the librarian 1800 are shown in a table 1900 in FIG. 14.

Figure 15:
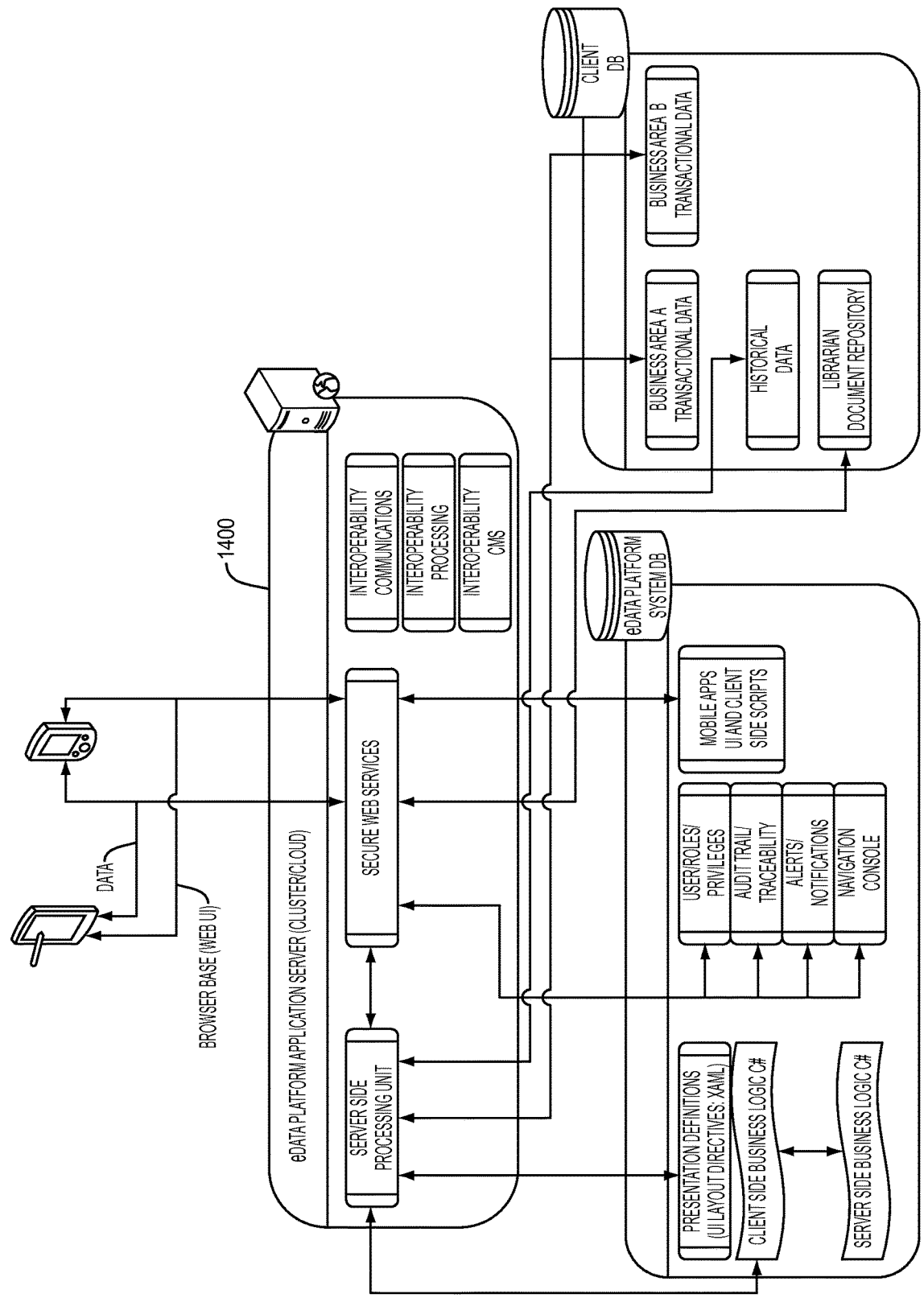
FIG. 15 is a block diagram of an exemplary mobile eData platform.

As shown in FIG. 15, the eData Platform supports mobile applications. The capacity to deploy operating system (OS) and device independent software enables administrators of the mobile extensions platform to design, deploy and maintain a single source code base for multiple mobile device and operating systems. By using modern technologies and best practices, mobile devices and tables can operate in connected or occasionally connected modes. Mobiles applications can be designed as classic web applications or hybrid solutions.

The present invention includes a unique canvas driven design platform enabling a design of full scale mobile data management applications for any device or operating system (OS). In some cases, the canvas design methodologies of the present application are can applicable for desktop applications. The canvas design environment enables the operator to develop an application, assign necessary properties, set events and triggers, and define client-side application behavior regardless which operating system or real estate is involved.

The eData Mobile Platform supports deployment, execution and management of mobile web solutions as well as hybrid applications (e.g., native code) for smart phones and tablets by utilizing industry-standard technologies and tools wrapped around a unique execution shell. Reusing code, per-platform optimization, next-generation mobile middleware and powerful management and analytics enable the platform to address most of the organization needs for mobile solution.

Figure 16:
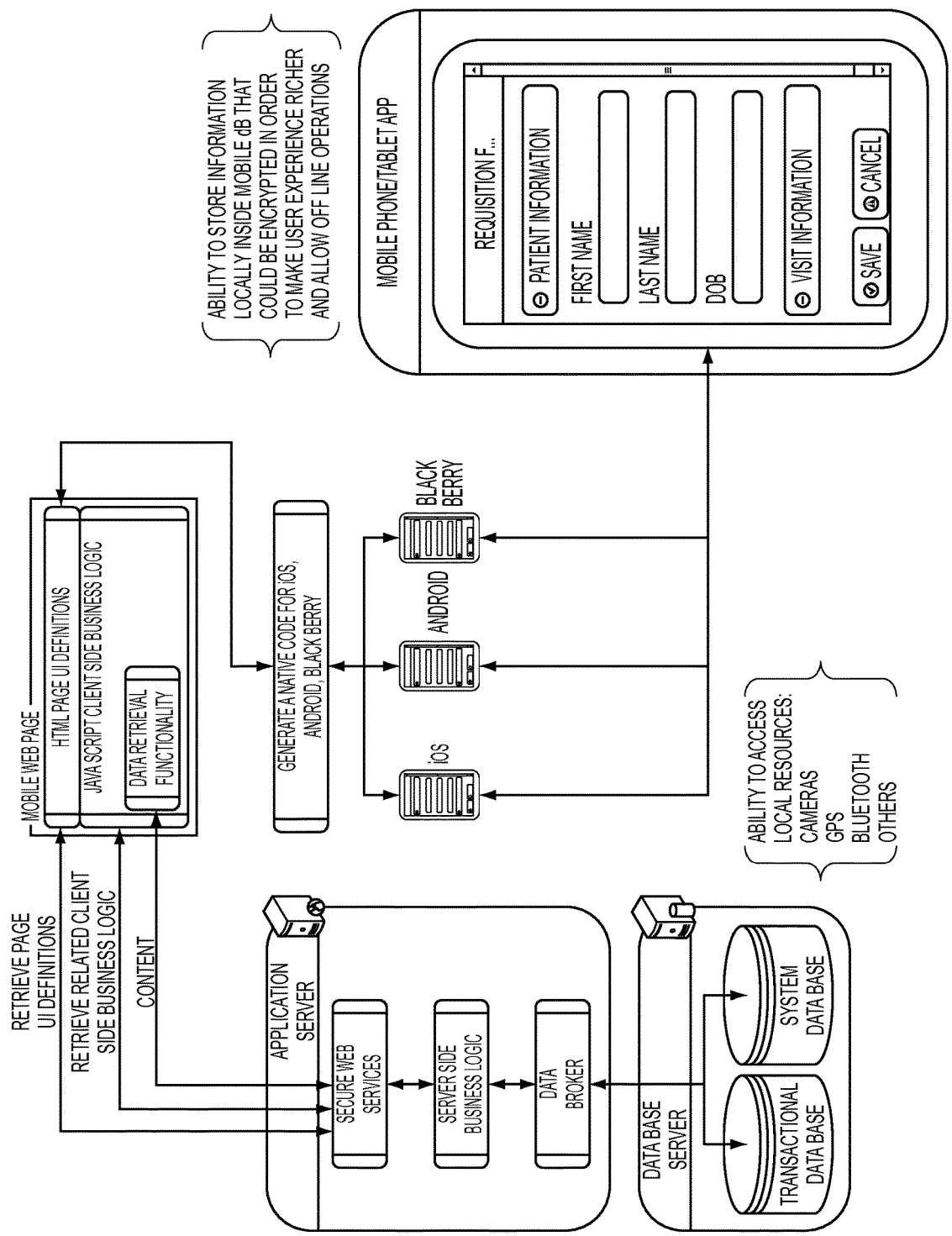
FIG. 16 is a block diagram of an exemplary hybrid eData platform.

As shown in FIG. 16, in order to enable a usage of device peripheral resources and add-on features, a hybrid solution is engaged. Using a software development kit (SDK) makes it possible to access local resources. Most security-related issues are addressed directly on a local device making it possible to access and use a local device storage. In addition to other features, the platform delivers secure application deployment, user authentication, access authorization, encrypted server/client communication and secure off-line access that includes on-device encryption and off-line authentication.

Figure 17:
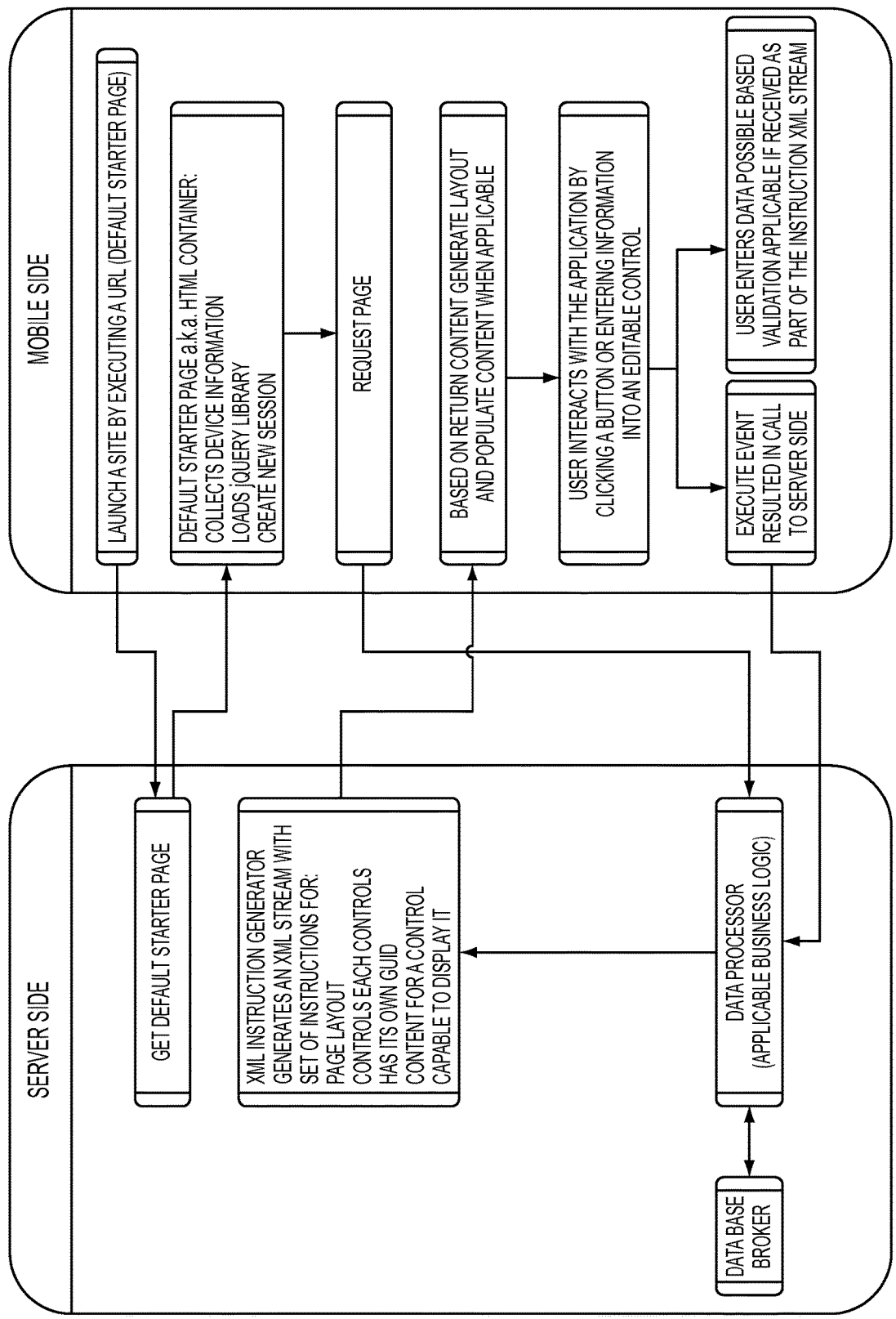
FIG. 17 illustrates exemplary device applications.

As shown in FIG. 17, the present invention enables an ability to deploy device specific shell applications with embedded canvas designed applications and incorporated support for all the available incorporated devices (e.g., Bluetooth, Scanners, Printers, GPS, Camera and so forth).

Figure 18:
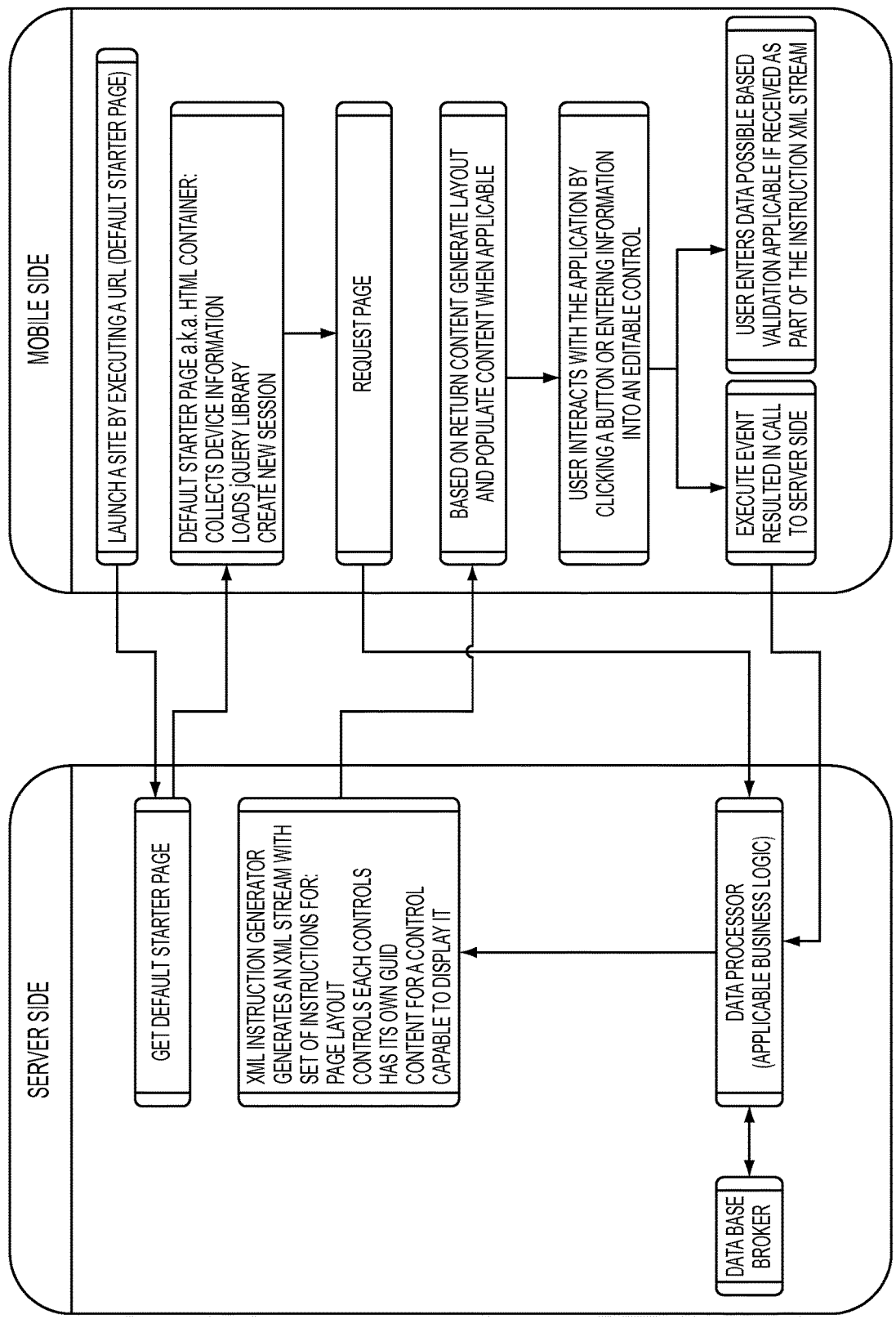
FIG. 18 illustrates exemplary data processing applications.

As shown in FIG. 18, the present invention provides a method that enables an ability to support complex data processing operations.

Figure 19:
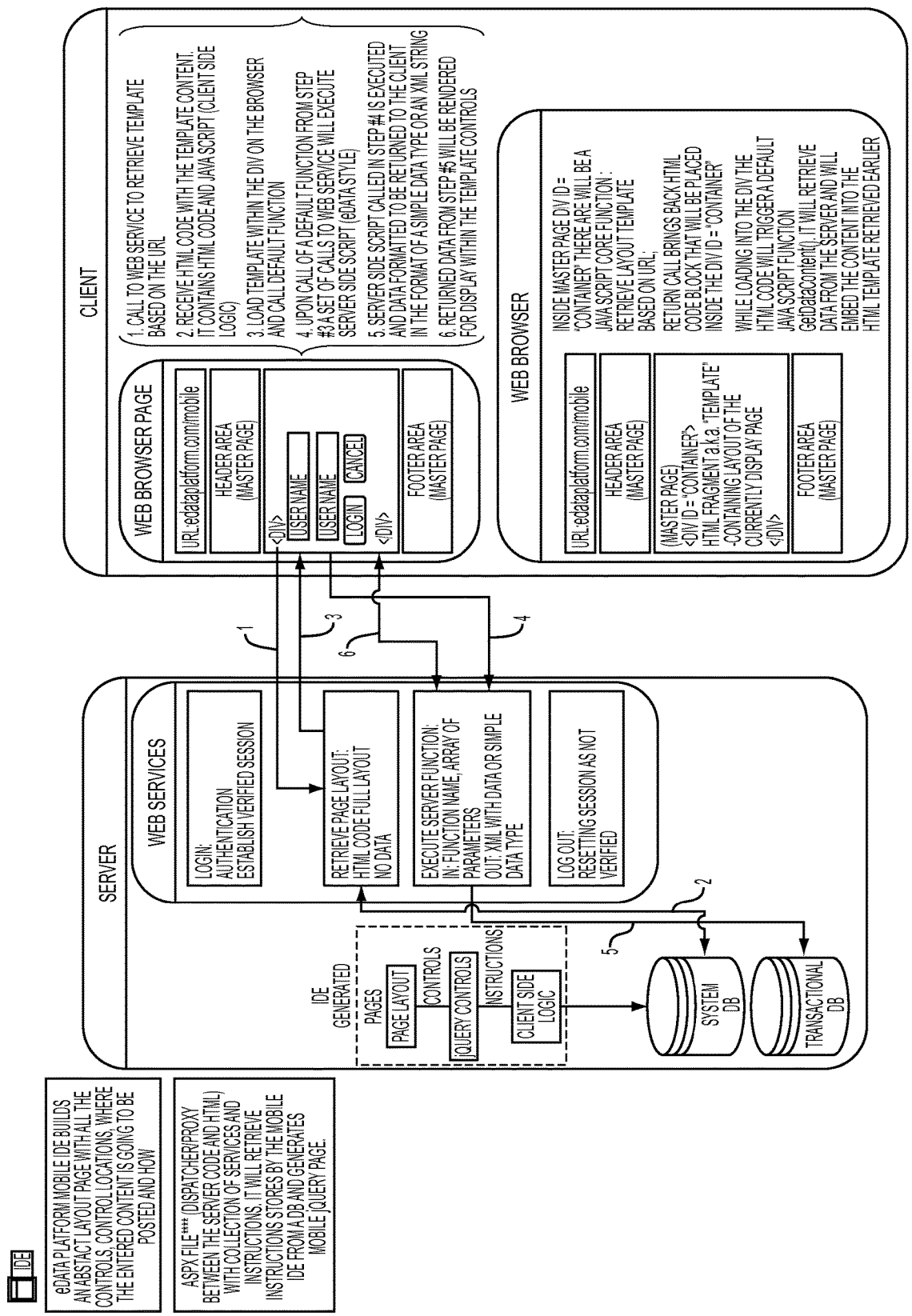
FIG. 19 illustrates exemplary on-demand applications.

As shown in FIG. 19, the present invention enables a methodology and technological process to design and deploy on demand applications.

The development environment enables access to device application programming interfaces (APIs) using native code bridge, use of native and HTML5 in the same application, the addition of frameworks such as JQuery Mobile, the maximizing of code-sharing among different environments, the deployment of one app for different devices from the same OS, and connection to development, testing and debugging tools in device SDKs.

A back-end server enables connection to back-end systems using configurable Extensible Markup Language (XML) files, automatic conversion of hierarchical data to JavaScript Object Notation (JSON) format, push back-end notifications using a uniform architecture, updating of web content of applications directly from the server, decoupling of client calls from data retrieval using flexible cache, and mash-up of multiple data sources to reduce overall network traffic.

Client components are enabled for connectivity and authentication APIs, local encryption, off-line authentication and remote disable, runtime user interface (UI) abstractions and HTML5 compatibility, hybrid application framework, access device APIs and Push registration, and direct update of application web resources and HTML5 caching.

All applications deployed within the eData platform use the standard Secure Sockets Layer (SSL) protocol. This enables complete data encryption while in transit from the server to the mobile user.

Although current mobile web development tools enable one to develop a full fledge data application, there is always a need to develop applications that utilize device hardware resources such as GPS, Camera, Scanners, Printers and so forth. In addition to this requirement, users have the need to work within the off-line mode. To enable off-line operation, a local Structured Query Language database (SQL dB) should be utilized. Storing data locally increases the risks of data being compromised. To address these major shortcomings, most device manufacturers implement a hardware level and OS level encryption.

Hardware encryption gives a base level of protection to data on a mobile device when the device is locked. Some devices also support an encrypted data store here passwords and other sensitive data can be stored in an encrypted state.

However, there are two caveats. First, data is not secure if the user of the device does not enable locking of the device and second, some of these hardware encryption approaches have been compromised. To address this, the eData Platform uses the following methodology.

For mobile application developers, the platform uses internal software level encryption functionality when storing information within the device local SQL dB and does not store sensitive data locally. The platform also limits local storage to lookup and not sensitive content.

For end users, the platform enables device encryption enable device locking and password protection.

Since native code applications use HTML and JavaScript, many of the security concerns are similar to those concerns on the World Wide Web. While the fact that cross domain network requests are possible from a that type of an application may seem like an additional security concern, there has always been a number of different ways to do cross domain requests from web applications running in browsers that respect the same origin policy (e.g., sending data in the query string of a GET request as the result of loading an image, script and so forth).

Like any web based application, a PhoneGap application is subject to Cross Site Request Forgery. To protect against this attack, vector before rendering data in an application the data should be cleaned to ensure that HTML tags are not being rendered to the view that could initiate an XSS attack. As with any web application, data should also be cleaned on the server before it is inserted into the database.

Use a nonce. Use POST when changing data on the server. Additionally, Cross-site scripting (XSS) prevention exists in the form of white-listing domains from which the client can request resources from. This is a platform-specific feature that exists on BlackBerry® through the config.xml, while on Google Android® and Apple iOS® it is not currently supported.

JSON.parse is used to prevent malicious content from being executed in the context of an application using something like JavaScript eval( . . . ). There is no built in prevention mechanism against JavaScript injection. It is up to the application developer to follow strict guidelines while implementing a mobile solution.

Figure 20:
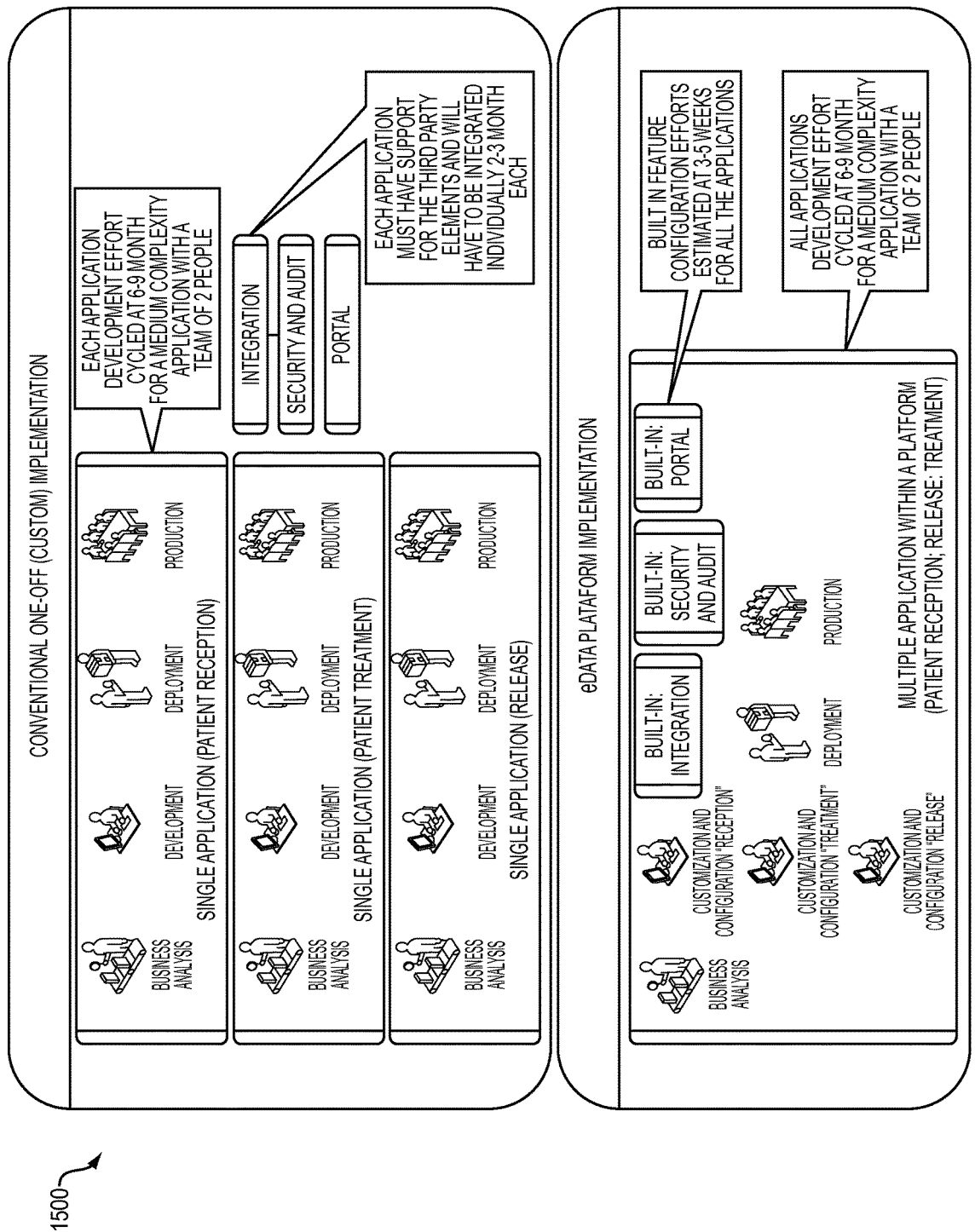
FIG. 20 illustrates an exemplary implementation.

An exemplary implementation approach is shown in FIG. 20. While conventional one-off custom deployments can take several months or even years and cost hundreds of thousands of dollars, eData Platform applications can be developed and deployed in a fraction of the time and at a substantially reduced cost. The time and cost savings are made possible through the integrated approach to development as well as the power of the eData Platform rapid deployment.

Figure 21:
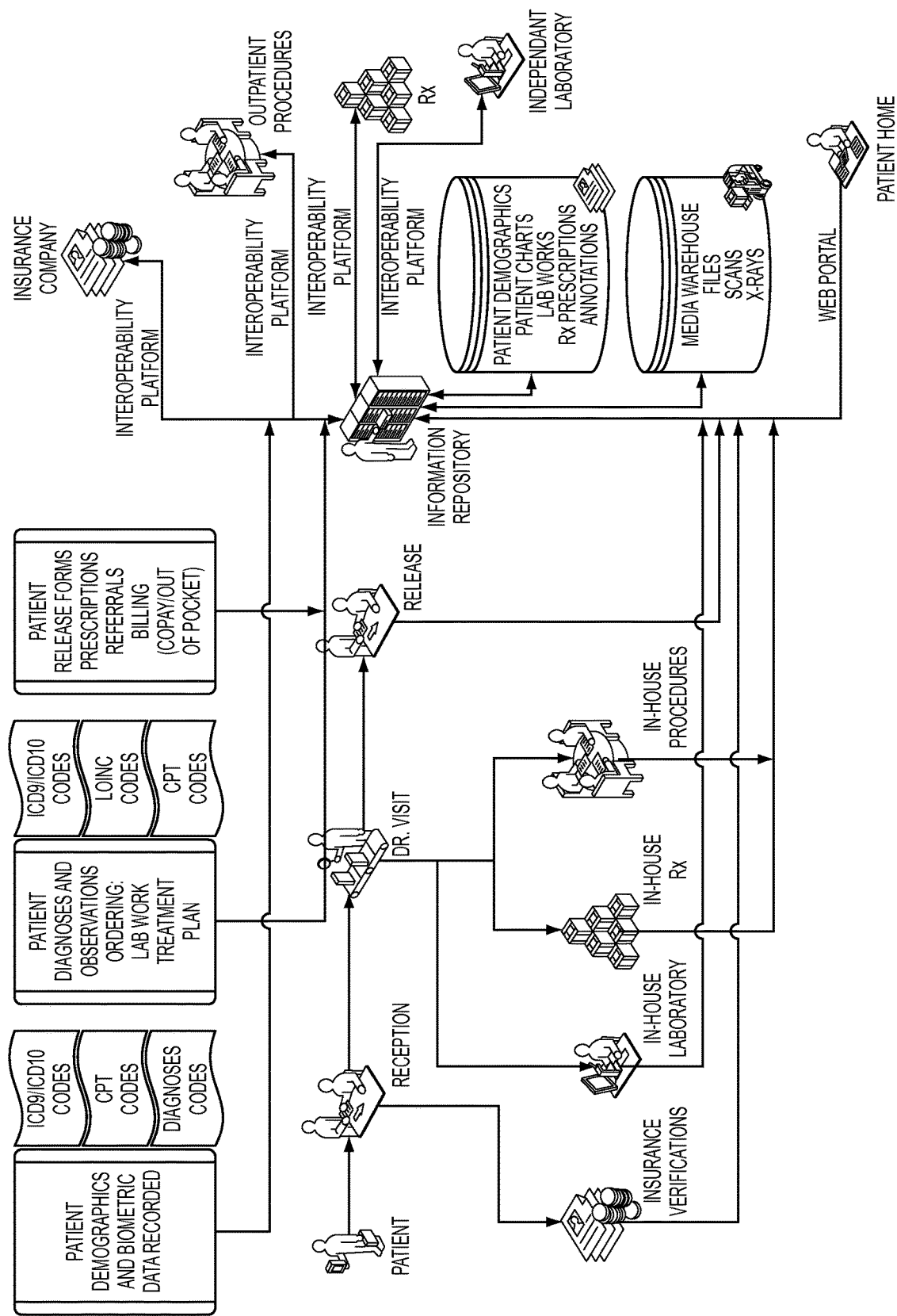
FIG. 21 illustrates an exemplary health records implementation.

FIG. 21 illustrates an exemplary electronic health records ("EHR")/electronic medical records ("EMR") case. The advantages of EHR and EMR are numerous and well-documented. The Federal government recognized their importance and responded with a mandate to have full digital health records by 2014. In order to comply with the mandate, healthcare organizations must solve the riddle of integrating multiple disparate systems that each provides a dedicated function.

The eData Platform Interoperability CMS fills the information gap between healthcare providers and external partners. Through straightforward configuration, a hospital or doctor's office can securely exchange patient-related information with outpatient clinics, pharmacies, clinical laboratory service providers, insurance companies and so forth. Gone is the need to re-enter information sent on a hard-copy form or to decipher handwritten prescription. Safe and secure data exchange using the eData Platform Interoperability CMS increases efficiency and reduces costly errors that arise from delays or errors in data transcription.

Figure 22:
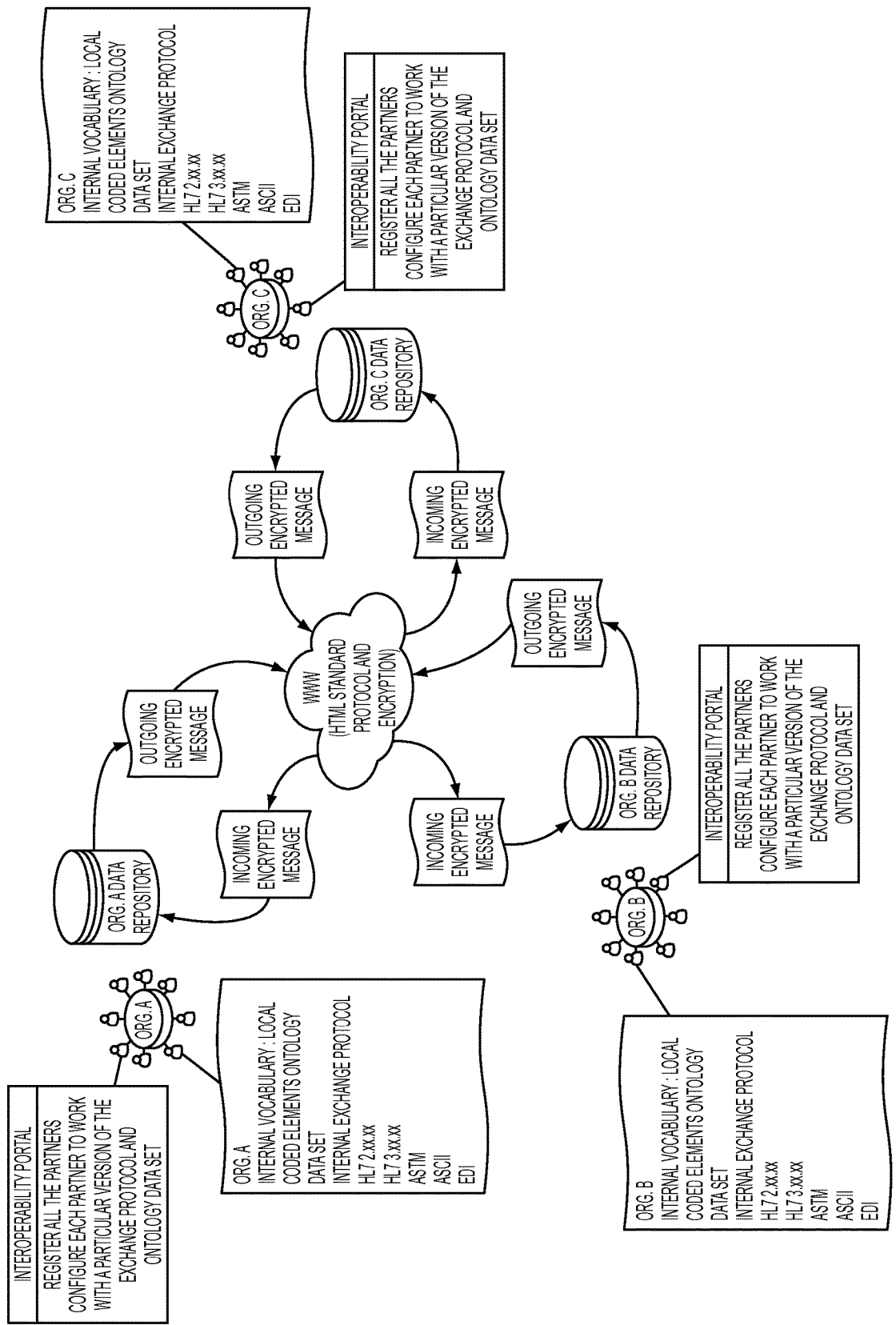
FIG. 22 illustrates an exemplary trans agency implementation.

FIG. 22 illustrates an exemplary Trans Agency Information Exchange case. There are situations in which near real-time communication of information and coordination of resources is critical for a positive outcome. For example, the H1N1 Swine Flu pandemic required worldwide exchange of data in order to understand where the disease originated and how it spread within and between regions. For the most part, communication consisted of the exchange of spreadsheets, phone calls and emails. International and domestic agencies lacked both the mechanism to rapidly and reliably communicate with each other as well as a common language. World health agencies did a remarkable job in reacting to the crisis, however, the response may have been made more efficient by the proper tools being in place. The eData Platform provides a solution with which virtually all barriers to communication are overcome. The Interoperability CMS serves as a bridge between agencies and compensates for differences in language, vocabulary or communication protocol.

Current software solutions typically use a standard approach to implement user interfaces (UIs). Some of the typical elements supporting interactive user experiences are electronic forms (e.g., software vendors), web pages (e.g., HTML, PHP or ASPX) or electronic documents (Microsoft Word®, Microsoft Excel®, and portable document format (PDF)). Each existing elements of a UI are typically deployed as a compiled or custom generated graphical interface with custom support for data manipulation. In order to modify or design new interfaces, a renewed investment of time and money is required. Additional efforts are needed to deploy new or modified interfaces as well.

Figure 23:
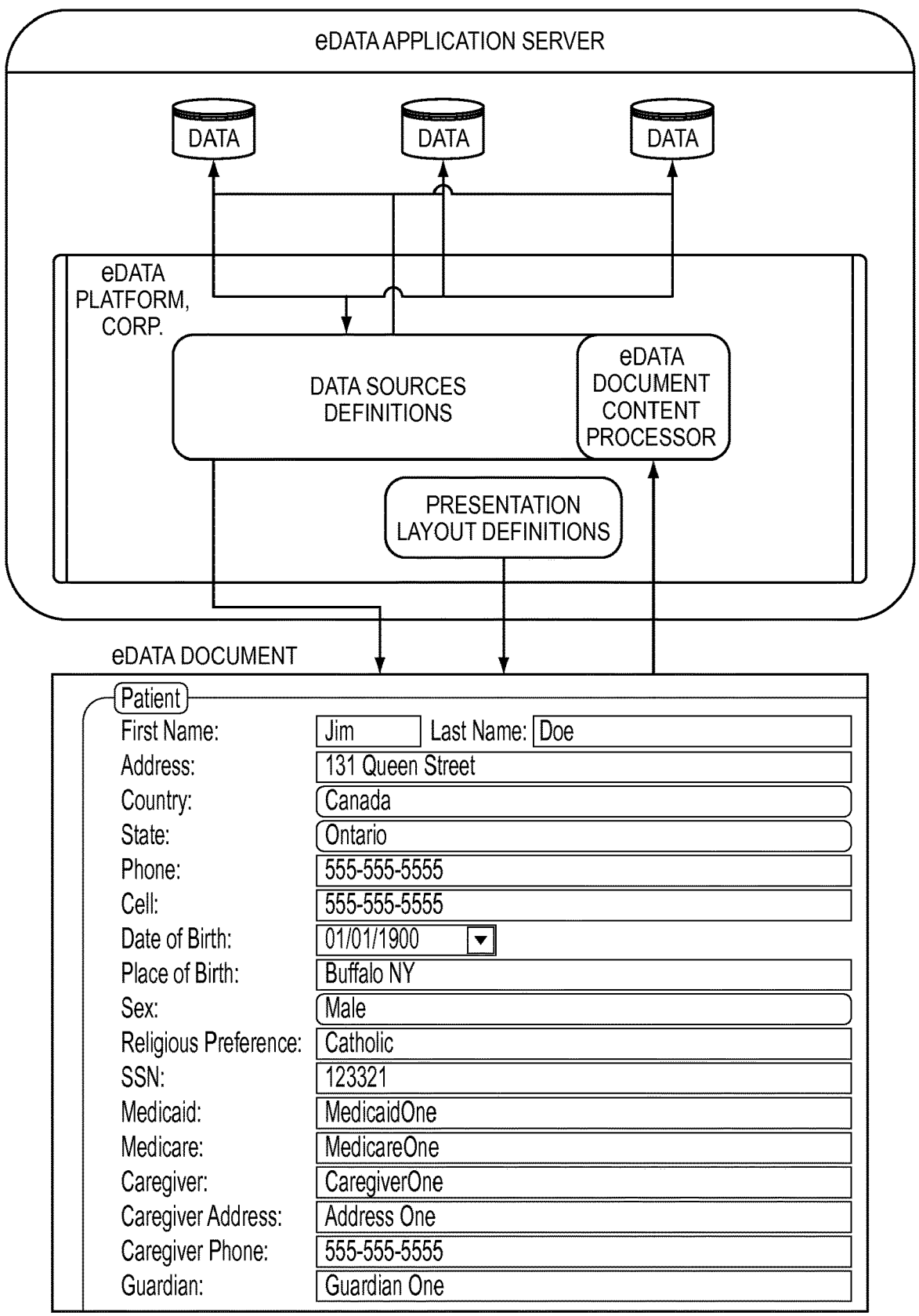
FIG. 23 illustrates an exemplary eData document.

In certain implementations, as shown in FIG. 23, the eData Platform includes an interactive electronic data form referred to herein as an eData Document. An eData Document is a fusion of electronic forms and electronic documents. A unique methodology combining user interface layout and data source definitions integrated within the eData Web Portal enables users to create, design/modify and deploy data driven interfaces. Minimum efforts are required to add new, clone existing or modify any element within an eData Document.

An additional layer of functionality is integrated within the eData Web Portal to accommodate eData Document design and deployment. Users no longer require usage of an external development environment, compiling and publishing changes to their existing interfaces. Use of eData Documents eliminates the typical dependency for development environments or custom "one off" approach for deployment of electronic data driven interfaces.

An eData document is a fully configurable system and doesn't require recompiling after creating and modifying a document. All instructions/rules for creating a document layout and an interaction with databases are stored in the XML templates. XML templates layout contains a description of all the eData Document controls, such as shape and form, database binding, behavior and other properties.

An eData Document does not have direct access to a database and uses an eData source module to communicate with the underlying database.

An eData document works with a virtual dataset managed and supported by the eData source. This data set has a required table's structure based on business logic and not necessarily representing a true underlying DB structure.

The eData source table's structure has a simple form that enables an end user to create its own tables/columns without knowledge of any particular database or physical structure.

The eData source is an intermediate virtual layer between the eData document and the destination database. The architecture allows utilization of a single eData document with multiple databases without making any modification in eData document.

The eData document contains a set of user defined business logic rules. Rules are set and configured as external code behind, compiled into a dll and attached to a eData document template on the fly.

The eData source is a common pre-compiled module which uses an XML template to determine table/column structure, fields validation and binding to an underlying database.

To save data entered by the user via an eData document, the eData source creates a set transaction based SQL statements.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a pre-defined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a network interface;
a memory; and
a processor configured to process instructions that:
provide a console management module to enable modification of agent properties that are stored in an interoperability system database, modification of dispatcher properties that are stored in the interoperability system database and a generation of templates,
provide a users management module to manage one or more users,
provide a notifications manager module for management of notifications,
provide a search pad module for searching,
provide an application deployment manager module to deploy the application,
provide an audit trail and traceability manager module for audits,
provide an interoperability broker comprising one or more remote agents, provide an application processing server and processing adapter,
provide a content management solution (CMS), and
provide a data repository,
wherein the content management solution serves as a bridge between said one or more remote agents, and compensates for differences in one or more of language, vocabulary and communications protocol.

2. The apparatus of claim 1 wherein the one or more remote agents are a stand alone application or a module of another application located on a remote client computer, the one or more remote agents collecting information on a client computer and maintaining communication with an interoperability dispatcher.

3. The apparatus of claim 2 wherein the interoperability dispatcher is configured to manage and launch adapter applications initiated by the client by receiving Simple Object Access Protocol (SOAP) and JavaScript Object Notation (JSON) requests from client applications.

4. The apparatus of claim 1 wherein the application processing server and processing adapter comprises one or more .NET pre-compiled data definition language (DDL) modules that process an agent's request and returns a result to the agent, and a group of public methods available to an interoperability dispatcher.

5. The apparatus of claim 1 wherein the content management solution (CMS) enables visual mapping rules for parsing structured content to and from a storage location, and visual mapping rules for converting sets of coded elements between coding systems.

6. The apparatus of claim 5 wherein the CMS further enables managing configurations of remote modules, managing vocabularies of coded elements, and parsing rules.

7. The apparatus of claim 1 wherein the memory further comprises an equipment tracer and an equipment configuration manager.

8. The apparatus of claim 7 wherein the equipment tracer enables collection, parsing and sorting output data from a plurality of equipment.

9. The apparatus of claim 7 wherein the equipment configuration manager enables management of an inventory of instruments, configuration of parsing rules for a plurality of models of each of the instruments and monitoring measurement results for each of the instruments.

10. The apparatus of claim 1 wherein the memory further comprises a librarian module.

11. The apparatus of claim 10 wherein the librarian module collects, parses base elements and stores documents in a plurality of formats to a database.

12. The apparatus of claim 11 wherein the librarian module further enables user creation of search criteria.

13. The apparatus of claim 12, wherein said documents comprise information from a plurality of sources, and wherein said documents that are stored are generated from one or more different sources, wherein said documents do not have direct access to a database, and wherein said document obtains data via a source module that communicates with the underlying database, and wherein said source module manages and supports a virtual dataset.

\* \* \* \* \*